United States Patent
Wineinger et al.

(10) Patent No.: US 9,449,195 B2
(45) Date of Patent: Sep. 20, 2016

(54) METHOD AND APPARATUS TO PERFORM ONLINE CREDENTIAL REPORTING

(75) Inventors: Gerald William Wineinger, Fairview, TX (US); Travis Jay Wineinger, Portland, OR (US); Joseph Eric Coleman, Plano, TX (US); Terry James Hegg, Plano, TX (US)

(73) Assignee: AVOW NETWORKS INCORPORATED, Fairview, TX (US)

( * ) Notice: Subject to any disclaimer, the term of this patent is extended or adjusted under 35 U.S.C. 154(b) by 448 days.

(21) Appl. No.: 12/691,901

(22) Filed: Jan. 22, 2010

(65) Prior Publication Data

US 2010/0192068 A1 Jul. 29, 2010

Related U.S. Application Data

(60) Provisional application No. 61/146,687, filed on Jan. 23, 2009.

(51) Int. Cl.
G06F 21/64 (2013.01)
H04L 9/32 (2006.01)
G06F 17/30 (2006.01)

(52) U.S. Cl.
CPC ....... *G06F 21/645* (2013.01); *G06F 17/30905* (2013.01); *H04L 9/321* (2013.01)

(58) Field of Classification Search
CPC ... H04L 63/20; H04L 63/08; H04L 63/1441; H04L 63/0823; H04L 9/321; G06F 3/0481; G06F 21/10; G06F 2221/2119; G06F 21/57; G06F 21/645
USPC ............... 715/738, 744, 205, 835, 853–855; 726/17–21; 713/175
See application file for complete search history.

(56) References Cited

U.S. PATENT DOCUMENTS

| 5,712,914 A | 1/1998 | Aucsmith et al. |
| 5,971,435 A | 10/1999 | DiCesare et al. |

(Continued)

FOREIGN PATENT DOCUMENTS

| CA | 2201067 | 2/1998 |
| CA | 2391572 | 5/2001 |

(Continued)

OTHER PUBLICATIONS

Hardt, Dick, Keynote Identity 2.0, O'Reilly Open Source Convention, http://www.youtube.com/watch?v=RrpajcAgR1E, YouTube Video, http://www.sxip.com/, website, 2010.

(Continued)

*Primary Examiner* — Andrew Tank

(57) ABSTRACT

Embodiments of the invention provide a process for displaying a graphical indicator on an Internet enabled device which conveys relationships between an entity associated with a website and third party entities with respect to the website entity. One example method may include obtaining the relationship data from a credential service provider, using a portion of a uniform resource identifier as a key to access the relationship data on the credential service provider, and rendering a representation of the relationship data, wherein the rendering of the relationship data is performed in a graphical user interface of a web browser, and wherein the web browser displays a rendering of the representation of the relationship data such that there is a relationship between an entity associated with the uniform resource identifier and a third party entity.

20 Claims, 8 Drawing Sheets

(56) References Cited

U.S. PATENT DOCUMENTS

| | | | |
|---|---|---|---|
| 6,272,761 B1 | 8/2001 | Pechter | |
| 6,422,460 B1 | 7/2002 | Boesch | |
| 6,564,320 B1 | 5/2003 | de Silva et al. | |
| 6,584,214 B1 | 6/2003 | Pappu et al. | |
| 6,965,881 B1* | 11/2005 | Brickell et al. | 705/76 |
| 7,020,634 B2 | 3/2006 | Khaishgi et al. | |
| 7,020,773 B1 | 3/2006 | Otway et al. | |
| 7,024,691 B1* | 4/2006 | Herzberg et al. | 726/5 |
| 7,114,177 B2 | 9/2006 | Rosenberg et al. | |
| 7,140,045 B2 | 11/2006 | Gudorf et al. | |
| 7,275,044 B2 | 9/2007 | Chauvin et al. | |
| 7,287,271 B1 | 10/2007 | Riggins | |
| 7,289,971 B1 | 10/2007 | O'Neil et al. | |
| 7,290,288 B2 | 10/2007 | Gregg et al. | |
| 7,298,851 B1 | 11/2007 | Hendricks et al. | |
| 7,299,493 B1 | 11/2007 | Burch et al. | |
| 7,316,027 B2 | 1/2008 | Burch et al. | |
| 7,333,635 B2 | 2/2008 | Tsantes et al. | |
| 7,340,600 B1 | 3/2008 | Corella | |
| 7,340,608 B2 | 3/2008 | Laurie et al. | |
| 7,346,605 B1 | 3/2008 | Hepworth et al. | |
| 7,346,923 B2 | 3/2008 | Atkins et al. | |
| 7,349,912 B2 | 3/2008 | Delany | |
| 7,350,188 B2 | 3/2008 | Schulz | |
| 7,350,229 B1 | 3/2008 | Lander | |
| 7,353,384 B2 | 4/2008 | Leyland et al. | |
| 7,356,694 B2 | 4/2008 | Mayo et al. | |
| 7,360,080 B2 | 4/2008 | Camnisch et al. | |
| 7,360,092 B1 | 4/2008 | Peterson et al. | |
| 7,360,096 B2 | 4/2008 | Bracewell et al. | |
| 7,362,752 B1 | 4/2008 | Kastenholz | |
| 7,363,339 B2 | 4/2008 | Delany et al. | |
| 7,363,486 B2 | 4/2008 | Audebert et al. | |
| 7,363,500 B2 | 4/2008 | Funk | |
| 7,366,786 B2 | 4/2008 | Lim et al. | |
| 7,366,900 B2 | 4/2008 | Shambroom | |
| 7,366,905 B2 | 4/2008 | Paatero | |
| 7,552,468 B2 | 6/2009 | Burch et al. | |
| 7,558,737 B2 | 7/2009 | Sudhi | |
| 7,571,314 B2* | 8/2009 | Lortz | 713/157 |
| 7,581,248 B2 | 8/2009 | Atkins et al. | |
| 7,583,814 B2 | 9/2009 | Braudaway et al. | |
| 7,594,193 B2* | 9/2009 | Thomas | 715/835 |
| 7,725,930 B2* | 5/2010 | Lawrence et al. | 726/10 |
| 7,966,553 B2* | 6/2011 | Iverson | 715/205 |
| 8,074,272 B2* | 12/2011 | Choi et al. | 726/17 |
| 8,312,526 B2* | 11/2012 | Karabulut | 726/10 |
| 2002/0083014 A1 | 6/2002 | Brickell et al. | |
| 2003/0070101 A1 | 4/2003 | Buscemi | |
| 2003/0088772 A1 | 5/2003 | Gehrmann et al. | |
| 2003/0140252 A1 | 7/2003 | Lafon et al. | |
| 2003/0163686 A1* | 8/2003 | Ward et al. | 713/156 |
| 2003/0172032 A1 | 9/2003 | Choquet | |
| 2004/0153352 A1 | 8/2004 | Berns et al. | |
| 2005/0050003 A1 | 3/2005 | Silverman | |
| 2005/0114701 A1 | 5/2005 | Atkins et al. | |
| 2006/0068755 A1 | 3/2006 | Shraim et al. | |
| 2006/0069697 A1 | 3/2006 | Shraim et al. | |
| 2006/0123465 A1 | 6/2006 | Ziegler | |
| 2006/0212925 A1 | 9/2006 | Shull et al. | |
| 2006/0212930 A1 | 9/2006 | Shull et al. | |
| 2006/0212931 A1 | 9/2006 | Shull et al. | |
| 2006/0218403 A1* | 9/2006 | Sauve et al. | 713/175 |
| 2006/0230039 A1 | 10/2006 | Shull et al. | |
| 2006/0230265 A1* | 10/2006 | Krishna | 713/158 |
| 2006/0253580 A1 | 11/2006 | Dixon et al. | |
| 2007/0028301 A1 | 2/2007 | Shull et al. | |
| 2007/0107053 A1 | 5/2007 | Shraim | |
| 2007/0162349 A1 | 7/2007 | Silver | |
| 2007/0177768 A1 | 8/2007 | Tsantes et al. | |
| 2007/0179794 A1* | 8/2007 | Fisher et al. | 705/1 |
| 2007/0180506 A1 | 8/2007 | Query | |
| 2007/0192853 A1 | 8/2007 | Shraim et al. | |
| 2007/0250916 A1 | 10/2007 | Shull et al. | |
| 2007/0250919 A1 | 10/2007 | Shull et al. | |
| 2007/0294352 A1 | 12/2007 | Shraim et al. | |
| 2007/0294762 A1 | 12/2007 | Shraim et al. | |
| 2007/0299777 A1 | 12/2007 | Shraim et al. | |
| 2007/0299915 A1 | 12/2007 | Shraim et al. | |
| 2008/0005103 A1 | 1/2008 | Ratcliffe et al. | |
| 2008/0008348 A1 | 1/2008 | Metois et al. | |
| 2008/0034211 A1 | 2/2008 | Shull et al. | |
| 2008/0046984 A1* | 2/2008 | Bohmer et al. | 726/5 |
| 2008/0065611 A1 | 3/2008 | Hepworth et al. | |
| 2008/0086638 A1 | 4/2008 | Mather | |
| 2008/0086759 A1 | 4/2008 | Colson | |
| 2008/0183664 A1* | 7/2008 | Cancel et al. | 707/2 |
| 2009/0064330 A1 | 3/2009 | Shraim et al. | |
| 2009/0119143 A1 | 5/2009 | Silver et al. | |
| 2009/0119402 A1 | 5/2009 | Shull et al. | |
| 2009/0193520 A1 | 7/2009 | Buss | |
| 2010/0287231 A1* | 11/2010 | Hughes et al. | 709/203 |

FOREIGN PATENT DOCUMENTS

| | | |
|---|---|---|
| CA | 2550275 | 6/2004 |
| CA | 2588723 | 6/2006 |
| CA | 2631778 | 10/2007 |

OTHER PUBLICATIONS

OpenID Authentication 2.0—Final, http://openid.net/specs/openid-authentication-2_0.html, website, Dec. 5, 2007.

* cited by examiner

METHOD AND APPARATUS TO PERFORM ONLINE CREDENTIAL REPORTING

CROSS-REFERENCES TO RELATED APPLICATIONS

This application claims the benefit of U.S. Provisional Application No. 61/146,687, filed Jan. 23, 2009 by Wineinger, et al., and entitled "Solution to the Abuse of Credentials on the Internet."

TECHNICAL FIELD OF THE INVENTION

This invention relates to reporting credentials of an entity on the Internet or other such network. More particularly, this invention relates to establishing relationship data and credential data.

BACKGROUND OF THE INVENTION

There are many forms of credentials. Many entities, such as companies, organizations, associations, or individuals, can claim to have certain credentials without any recourse for someone to verify if the aforementioned credentials are legitimate. Credentialing programs, policies, or arrangements, often have a logo that is permitted for use by authorized entities according to predetermined rules and regulations. These logos are increasingly being abused by being placed on websites in an effort to falsely legitimize an entity that is not authorized to use the logos.

An example of such misuse is the display of a Better Business Bureau (BBB) logo on a website when the website owner is not a member of the "BBB" nor is the website owner authorized to use or display the logo. Another example is a website claiming "ISO 9000" certification when the entity represented is not certified.

Credentials allow an entity to gain the trust of people or potential customers that view their website. Generally, for an entity to gain a specific type of credential, such as, a certification of expertise or an educational degree, time and money is invested. When illegitimate use of a credential happens, the value of the credential is then lessened as public perception of its meaning is diluted due to misuse.

Consider a case where someone has a website claiming that they are a registered patent agent. If a potential customer of the patent agent does not check with the USPTO website to verify the claim, there is a risk of the person's idea being stolen by an unscrupulous imposter patent agent that is not authorized by the appropriate entity. Those being scammed in the example may then have a negative opinion of patent agents and in the future may refrain from seeking out the services of patent agents, therefore legitimate patent agents suffer by losing business.

When encountering a claim by a website on the Internet, such as, being an official reseller of merchandise from Apple® Computers, Inc., the only way to know for sure that the website is a legitimate reseller is to go to the website of Apple Computer, Inc. and then try to find a list of authorized resellers, if such a list even exists. This is a complex and tedious process as not all websites readily make available lists of entities that they've entered into a relationship with or bestowed credentials upon for purposes specific to their business or industry.

Consider the case of someone claiming to be a patent attorney. If someone hires a patent attorney, they would generally need to check multiple sources to verify the claims of various credentials. The USTPO would have to be queried to verify that the attorney is properly registered and authorized. Additionally, the appropriate state bar would have to be queried to verify that the attorney is still in good standing. The problem with this scenario is that one can't necessarily or easily verify that someone really is a lawyer at all, as not all state bars provide mechanisms for researching members and verifying their credentials, and not all persons are knowledgeable about such verifications procedures.

Credentials exist in many forms and in many industries. Doctors have credentials issued by medical establishments so that they may practice medicine. Educational institutions have credentials issued by commissions and various organizations in order to be officially recognized. Corporations have credentials issued by governments so that they may conduct business according to specific laws.

The concept of authenticating identity (that you are who you say you are) in today's virtual Internet-based society is increasingly difficult to substantiate. For example, once an identity has been supposedly authenticated, the entity can then make any claim imaginable. For example, a government issued identification card doesn't establish that a person is really a doctor. Authenticated identity on the Internet suffers the same limitations. A company with an Extended Validation Certificate (EV) certificate may have a robust identity established, but that identity can then make unsubstantiated claims, such as, being medically certified, which may end up being falsely seen as legitimate due to the extended verification SSL certificate.

Current methods for protecting credentials include, among others, legal proceedings when fraud is identified. This is problematic when the infringing entity is in another country. This is very costly and time consuming and only addresses problems or abuse of credentials that have been discovered. A current method for highlighting credentials bestowed on others is currently limited to the credential issuer making credential information available, or, by providing a link to the credentialed entities to put on their websites so that someone may click the link to go to the credential issuer's website for verification. Such embedded links or graphics can be easily spoofed with current technologies, such as, but not limited to, modern implementations of the ECMA-262 specification, commonly known as JavaScript. The current methods of protecting and promoting credentials on the Internet are costly or impractical, especially for small businesses.

BRIEF SUMMARY OF THE INVENTION

Embodiments of the invention provide systems and methods for credential information, in the form of third party established relationships, to be reported when accessing specific resources on a network by way of a networked device. According to one embodiment, a method to display relationship data may include obtaining the relationship data from a credential service provider, using a portion of a uniform resource identifier as a key to access the relationship data on the credential service provider, and rendering a representation of the relationship data, such that the rendering of the relationship data is performed in a graphical user interface of a web browser, and the web browser displays a rendering of the representation of the relationship data such that there is a relationship between an entity associated with the uniform resource identifier and a third party entity.

According to alternative embodiments, there are additional methods comprising alleviation of network congestion through use of credential information stored locally on an Internet enabled device According to alternative embodiments, there are additional methods comprising alleviation of network congestion through use of information obtained from a CSP or through implementation specific protocols for network access rules.

According to alternative embodiments, the invention can comprise an additional method of using a uniqueness identifier for controlling network congestion and altering the graphical indicator.

DETAILED DESCRIPTION OF THE INVENTION

Figure 1:
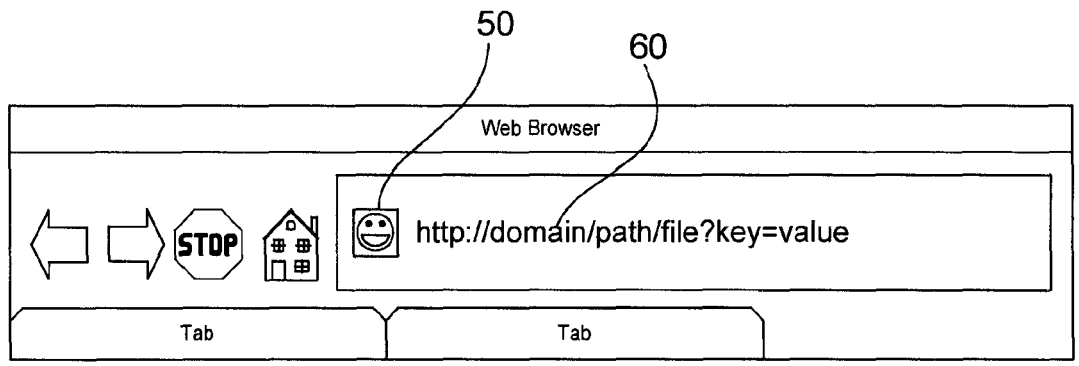
FIG. 1 is a partial view of a web browser, specifically the graphical user interface, according to example embodiments of the present invention.

Embodiments of the invention provide systems and methods for credential information, in the form of third party established relationships, to be reported when accessing specific resources on a network by way of a networked device.

Specific items need to be defined in order to provide a complete understanding of the invention. An Internet enabled device or application may be any computer program executed on a computing device or any physical device capable of accessing either or both the Internet or any private network. Furthermore, an Internet enabled application could be a web browser, a file transfer protocol (FTP) client, an Internet relay chat client, news group reader, gopher client, etc.

A person skilled in the art will appreciate that there are many different types of programs capable of accessing the Internet. An Internet enabled device can mean a cell phone, a video game device, a TV tuner box, a cable TV box, voice over Internet protocol (VOIP) devices, etc. A person skilled in the art will also appreciate that there are many devices that are capable of Internet access. For clarity and brevity, the term "web browser" should be any Internet enabled device or application capable of using a uniform resource identifier (URI) to access resources on the Internet or equivalent network.

A web browser, even when conceptualized as software or a computer program, still requires a computer to function, and is limited by the necessity of a physical device, generally a general purpose processor which executes instructions residing on physical media such that when the instructions are executed cause the processor to perform the functions of a web browser. A computer program or application may be a set of instructions on physical media, such as, but not limited to, a hard disk drive, that are executed by either a general or specific purpose processor to modify the state of the processor and optionally modify the state of any networked or attached devices.

A web browser may be interpreted as a computer readable medium comprising instructions that, at the very least, when read by a processor, cause the processor to modify internal state such that data is obtained from a network via the use of a uniform resource identifier.

Internet access, in the sense of a device being Internet enabled or Internet capable, may be the public Internet and may instead be a private network utilizing the Internet protocol (IP). A person skilled in the art will also realize that the Internet protocol is versioned, and this invention readily applies to all versions, existing or otherwise. There are other large networks similar to the public Internet that may use alternative protocols, but by their nature of being vast networks should be considered as equivalent structures or conglomerations of machines such that this invention could readily be utilized by web browsers or other software engines connected to such networks.

A credential may be, but is not limited to, a certificate, accreditation, license, membership status, authorization, title, grant, permit, warrant, and sanction. A credential, among the aforementioned, also encompasses various decrees that establish a relationship or bestowment.

A relationship may be a transfer, issuance, or existence of credentials between two entities, an issuer and a holder. A relationship exists between an issuer and holder in any of various forms, as defined by a credential. A relationship also encompasses an implied credential, either authorized or not authorized by any of either an issuer or a holder.

An issuer may be the entity that issues certifications, accreditations, licenses, warranties, or generally stated, credentials, which establish either a relationship or a bestowment of some kind. A holder may be an entity that is the recipient of certifications, accreditations, licenses, warranties, or generally stated, credentials, which establish either a relationship or a bestowment of some kind.

A credential service provider (CSP) is used interchangeably with the term Internet authority service, abbreviated as (IAS). Both CSP and IAS are functionally equivalent to one another. A CSP is an entity which exists as a neutral third party for purposes of consolidation, reporting, and verification of established relationships between issuers and holders. A CSP is neutral in the sense that a relationship that exists between an issuer and holder may be independent of the CSP.

In FIG. 1, a uniform resource identifier (URI) 60 is illustrated as being a part of the web browser GUI, according to example embodiments of the present invention. Some web browsers may not display the URI. Also displayed is a favorites icon, favicon, or shortcut icon 50. This element is particularly pointed out because the image displayed is determined by the document content, which is under the control of the site owner or page author. The URI is defined in the published request for comments (RFC) with an identification number of (RFC 2396), and as well as in updates to the standard in various other RFCs, such as, for example (RFC 3986), both of which are hereby incorporated by reference in their entirety. The use of an URI may include all variations and revisions of the definition of a URI, including future revisions, as defined by various RFC documents, as functionally equivalent regarding usage in the process defined in this patent.

Figure 2:
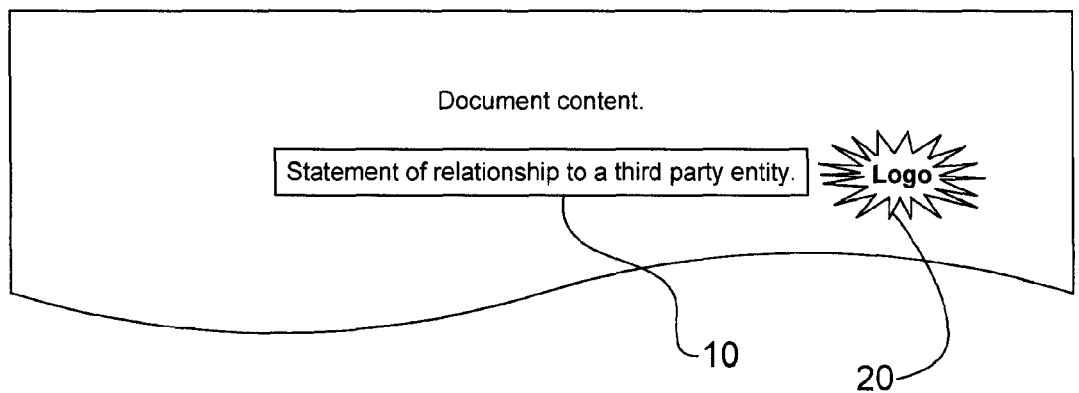
FIG. 2 is a partial view of a web browser's content display area, according to example embodiments of the present invention.

FIG. 2 illustrates a content window of a web browser, according to example embodiments of the present invention. A content window is where web pages are generally displayed. A relationship statement 10 is contained within the web page document. A logo 20 is contained or defined within the web page document. The relationship statement 10 and logo 20 are under the control of the site owner or page author, which is similar to the favorites icon 50 in terms of origin portion of FIG. 1.

Figure 3A:
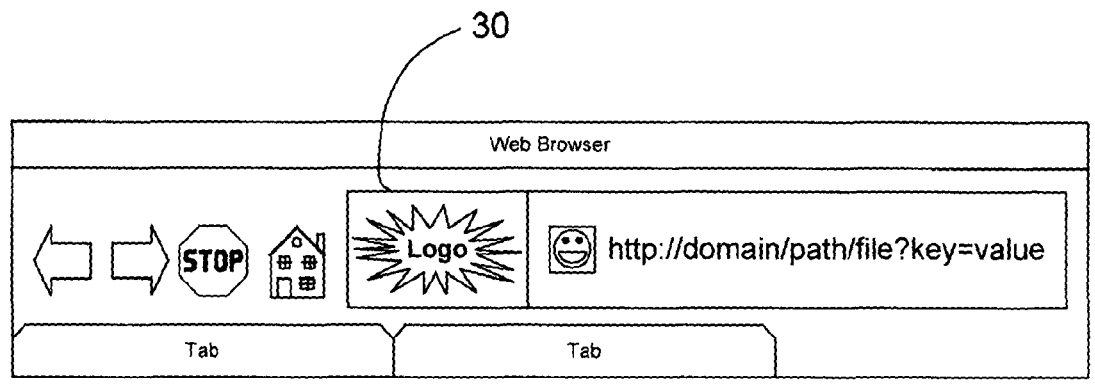
FIG. 3A is a partial view of a web browser GUI, according to example embodiments of the present invention.
Figure 3B:
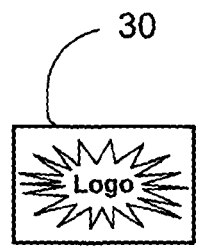
FIG. 3B is a detail view of FIG. 3A, according to example embodiments of the present invention.

FIG. 3A illustrates a web browser GUI with a relationship indicator 30, according to example embodiments of the present invention. FIG. 3B illustrates a relationship indicator 30 without the web browser GUI. A relationship indicator 30 need not necessarily be entirely graphical. A relationship indicator can also be the playing of a sound to accommodate persons with disabilities. A person trained in the art of user interface design will appreciate that a relationship indicator 30 can also be textual in nature, and could easily appear as a menu item within a web browser GUI, among other forms.

The form or expression of a relationship indicator 30 may be dependent on web browser GUI constraints. For example, a web browser on a cell phone is constrained in the amount of available display space. A relationship indicator 30 in such a scenario would be implemented to fit the situation, such as a button on the device, and/or an alert, and/or the requirement of user input to view the relationship information.

Figure 4:
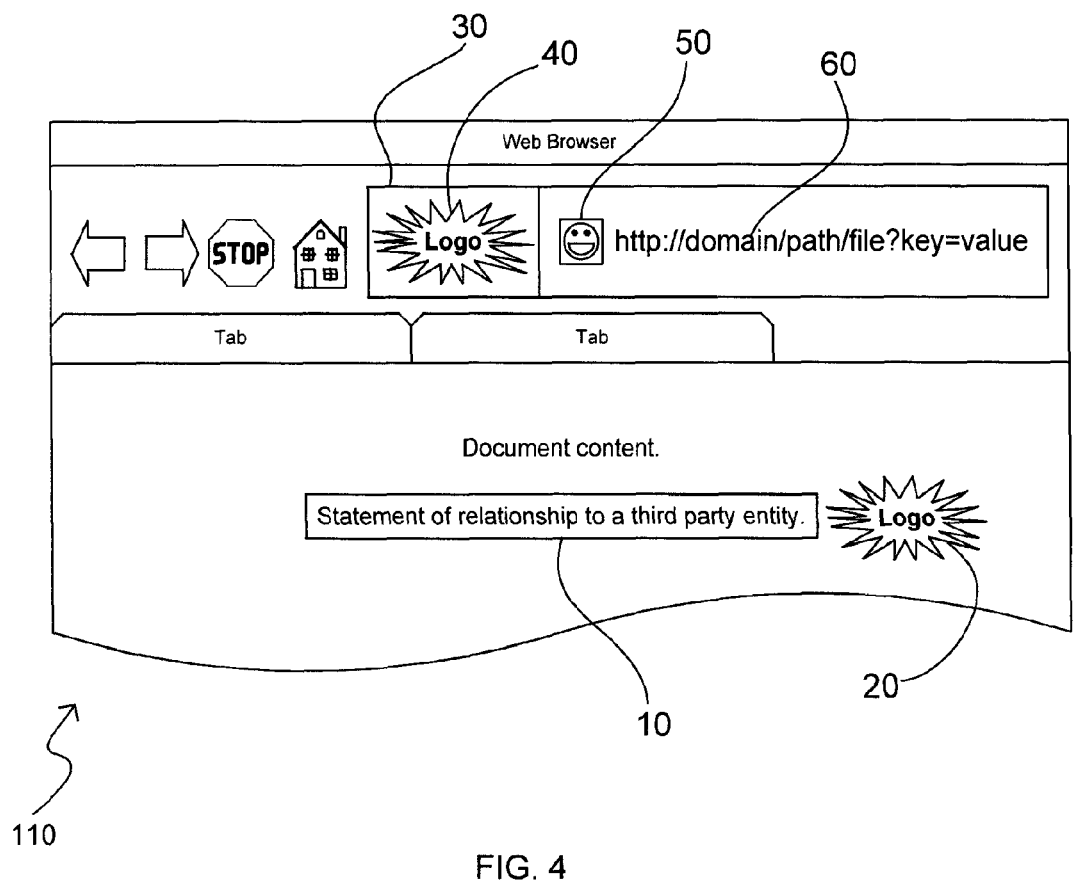
FIG. 4 is a partial view of a web browser, according to example embodiments of the present invention.

Illustrated in FIG. 4 is a combination view of various elements of a web browser along with a relationship indicator 30 within a web browser GUI, according to example embodiments of the present invention. An avowed logo 40 is conveyed by the relationship indicator 30. A web browser with the capability to display relationships may be, in the context of further illustrations, a web browser 110. One example distinction between an avowed logo 40 and a logo 20 is that the origin and control of an avowed logo 40 is from a CSP, while the origin of a logo 20 is under the control of the entity represented by the web page.

One skilled in the art can see that a web browser 110 can easily be represented in various forms, either as a software application, which may include a computer readable medium including instructions that when read by a processor, cause the processor to alter state, or within a hardware implementation, such as an application specific integrated circuit (ASIC), or as other such embedded tangible devices. A relationship indicator can readily be applied to various applications or devices that access resources on a network, such as, but not limited to, FTP clients, NNTP clients, Email clients, cell phones, personal digital assistants, TV signal receivers, and so forth.

Figure 5:
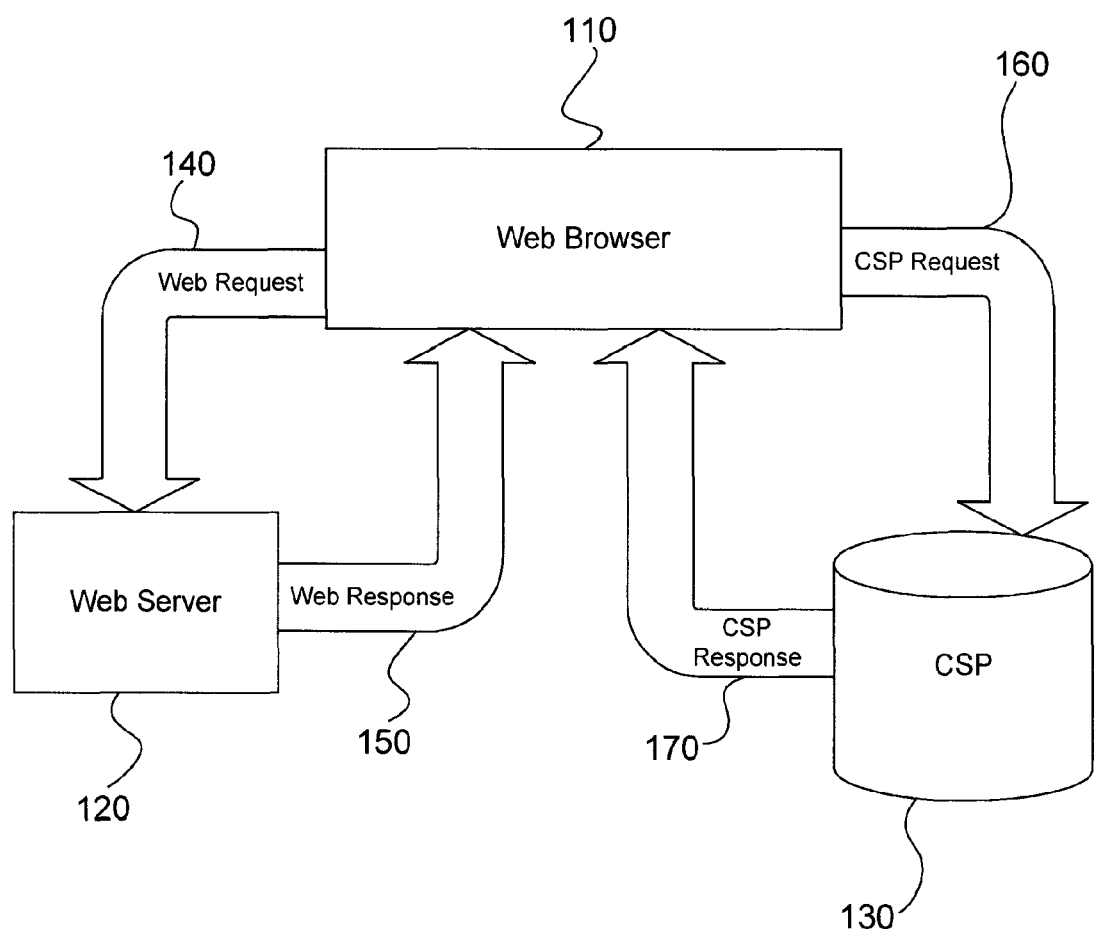
FIG. 5 is a general process for the preferred embodiment for use with web pages, according to example embodiments of the present invention.

FIG. 5 illustrates a web browser 110 interfacing with both a web server 120 and a CSP 130, according to example embodiments of the present invention. The web server 120 and web browser 110 communicate with a request 140 and a response 150. The web browser 110 and CSP 130 communicate via a request 160 and response 170. One skilled in the art recognizes that there are many variations in data transfer between a web browser 110 and a web server 120. Variations in protocols used in association with the web browser may include, but are not limited to, HTTP, HTTPS, POP, and/or SMTP.

FIG. 5 is an overall high level view of the isolation between the web server 120 and CSP 130 when communicating with a web browser 110. Within various connection protocols, connections to third party entities, as determined by necessity for encryption, is readily implied when speaking of a connection between a web browser 110 and web server 120. For example, there may be third party connections to certificate authorities in the context of a HTTPS connection to a web site. Such variation in connection between a web browser 110 and web server 120 is considered to also apply for the communication between a web browser 110 and a CSP 130.

One example embodiment of the invention in the context of information exchange between a CSP 130 and web browser 110, would be HTTP over SSL or TLS. In other words, a CSP request 160 and CSP response 170 may be encrypted. However, unencrypted communication is understood to be equivalent to encrypted communication with regard to communication with a CSP 130.

Figure 6:
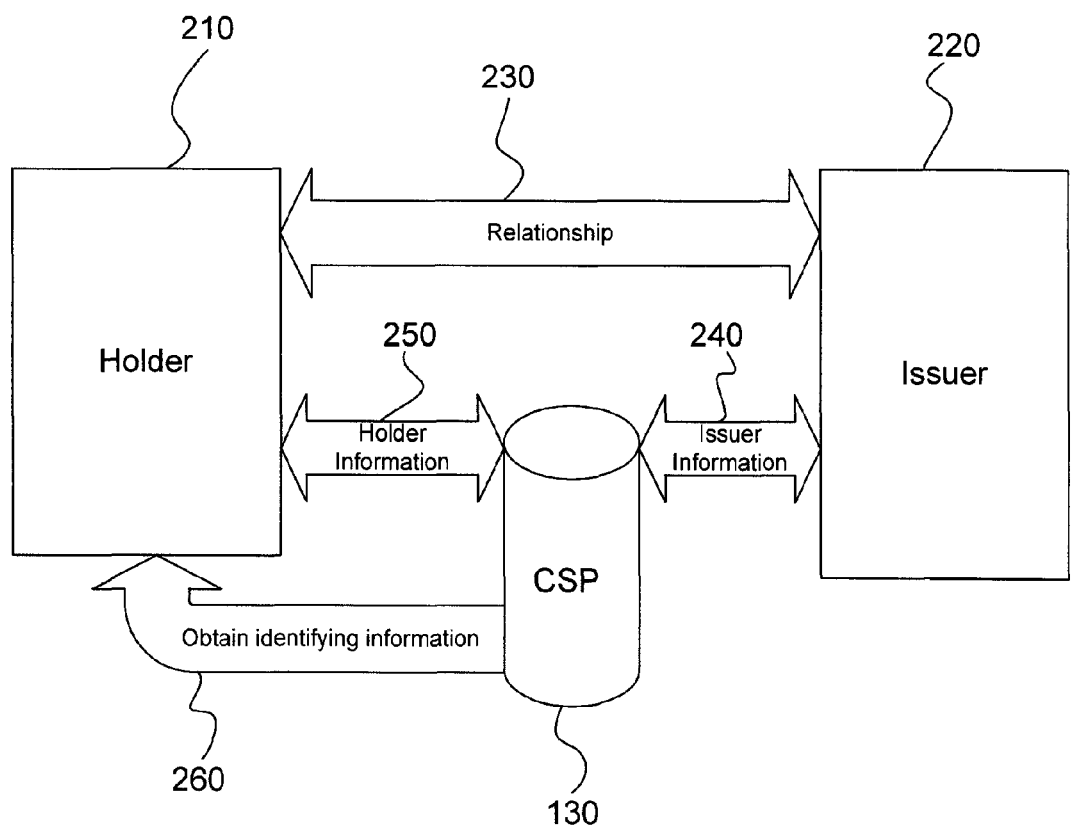
FIG. 6 is a general process for data acquisition, according to example embodiments of the present invention.

FIG. 6 illustrates the communication scheme for the CSP 130 to acquire relationship information, according to example embodiments of the present invention. A holder 210 and an issuer 220 have a relationship 230. Issuer 220 is the source of an issuer information exchange or issuer information 240 with the CSP 130. The CSP 130 may initiate a request for the issuer information 240 and/or the issuer 220 may push the issuer information 240 without being prompted by the CSP 130. The issuer information 240 may include relationship information, and can be transferred between parties involved by a telephone call, mail, or via electronic communication.

An example of the issuer information 240 may be represented by the following example, if issued in a letter sent by mail: "Any URI matching the pattern defined by 'http://*.gov/*' where the asterisk is a wildcard match, will result in a credential issued by the United States Government. The logo to be used can be found at a specific government website as well, such as, for example 'http://*.gov/logo.png.' Other details, as necessary for the credential, may be provided." These website locations are generic examples and are not intended to represent actual web location URIs.

Another example of issuer information would be an electronic transmission of information. Such an example in an XML format may look like the following:

```
<credential lang="en-US" charset="UTF-8">
    <match><![CDATA[http://*.gov/*]]></match>
    <exclude><![CDATA[http://*.gov.*/*]]></exclude>
    <issuer id="123456" />
    <holder id="789"></holder>
    <holder id="KC5BGN"></holder>
    <holder id="N5TVN"></holder>
    <logo><![CDATA[http://www.acme.gov/logo.png]]></logo>
    <details><![CDATA[This website is a U.S. government website.]]></details>
    <type>5</type>
    <issuedate>July 4, 1776</issuedate>
    <expire>Never</expire>
</credential>.
```

One skilled in the art recognizes that a relationship 230 may be both complex and multifaceted such that types and amounts of data will differ due to credentials, and also that issuer information 240 can be transferred between parties by various different communication schemes. Issuer information 240 is not specific to a single mode of communication, as each issuer 220 may have different communicative capabilities predetermined by how details of a relationship 230 are stored, as noted from FIG. 6.

FIG. 6 also illustrates holder information 250 and its connection to a CSP 130, according to example embodiments of the present invention. Typically, but not always, a holder will initiate information exchange regarding a relationship 230. The holder information 250 is similar to issuer information 240 in regards to physical exchange of information in the form of a phone call, mail, or electronically, etc. The similarities in content regarding holder information 250 and issuer information 240 are easily recognizable from their duplicative nature. For example, when a relationship 230 is established, the issuer 220 may instruct the holder 210 to include specific details regarding holder information 250. This may enable a verification to occur at a CSP 130 along with issuer information 240. The issuer 220 may also have stipulations in the formation of the relationship 230 that precludes holder information 250, thus making it optional.

A CSP 130 typically stores the data of a relationship 230 as provided by an issuer 220 and holder 210 in a database on one or more computers. One skilled in the art should know what constitutes a database on one or more computers. The device for storage of a database may consist of hard disk drives, solid state drives, optical disk drives, or random access memory, or functionally equivalent device for storage of digital data.

FIG. 6 also illustrates an optional operation, such as, obtaining identifying information 260. This may comprise of ownership information with regard to a URI, and/or identity information through a mechanism that validates identity established by another party. This identity information helps to maintain the relevant data obtained by a CSP in the scenario of a change in domain name ownership. For example, if a company, Acme Brick Co., which controls the domain "acme.tld", sells the domain name to another company, Aerospace Cosmological Mechanics and Engineers Co., then the identification information associated with the domain name would change, and any associated credentials for Acme Brick Co. would be invalid and expired.

Ownership information with regard to a URI may have a caliber of detail that is different from ordinary domain name ownership. For example, a website with a multitude of different identities may have specific ownership information and/or identity information associated with a variety and plurality of URI. For example, professionals.tld/archie would be associated with someone named Archie, while professionals.tld/veronica would be associated with someone named Veronica. In this example, if Archie fails to pay ownership dues for being listed on the site, the URI may become available for someone else with the same name and different credentials. In this scenario, identifying information 260 is used to establish the validity or invalidity of credentials associated with a URI due to a change in or status of the holder 210.

As noted above, the credential features may be entirely optional as the issuer 220 may have specific provisions used to monitor the status of its own credential holders 210. For example, consider Bob, who owns "Bob's Hardware," and has been issued a DBA (doing business as "DBA") by the local government to operate under the name of "Bob's Hardware" and has credentials by the local government as to the status of the DBA associated with a URI that Bob controls. Bob, in this example, is a holder 210, the local government is an issuer 220, and the relationship 230 is the DBA. If Bob has an accident in his hardware store that kills him, then his DBA may no longer be valid. The local government, which is the issuer 220, may get notified regarding Bob's death, and will then send information 240 to the CSP 130 regarding the expiration of the relationship 230 because Bob no longer controls the URI associated with the former relationship 230.

Figure 7:
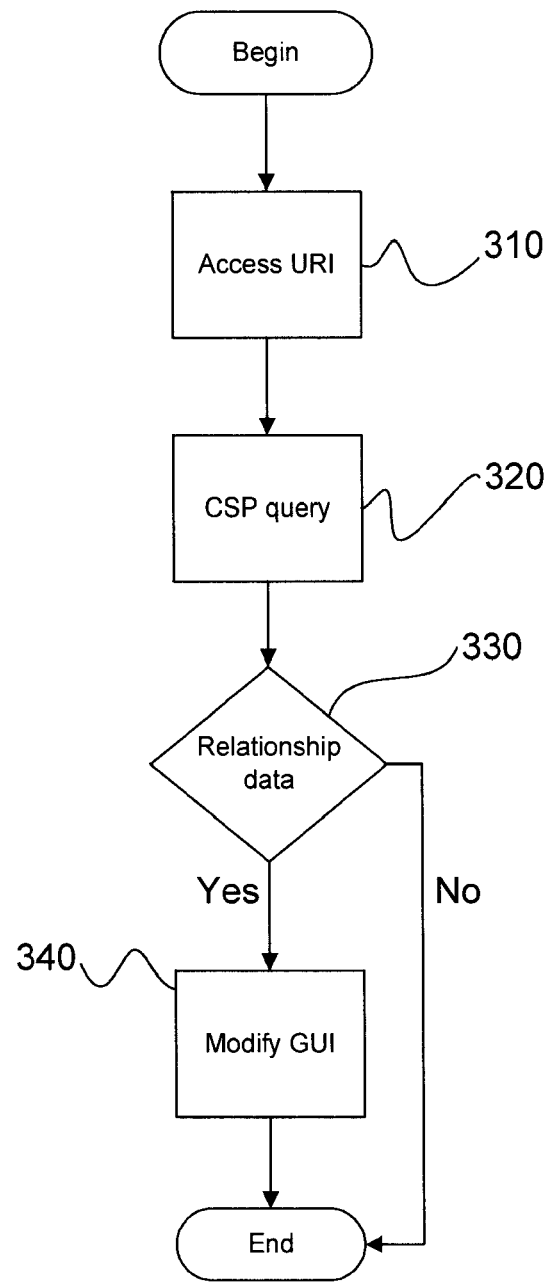
FIG. 7 is a flowchart example method, according to example embodiments of the present invention.

FIG. 7 illustrates a flowchart of process operations according to example embodiments of the present invention. Referring to FIG. 7, a URI 310 is accessed within the context of a web browser. The accessing of the URI 310 may occur when a person clicks on a hyperlink, manually enters a URI 60, or programmatically makes a modification, such as, via a JavaScript, or some other automatic accessing operation. Upon access of the URI 310, a CSP query 320 is performed. The CSP query 320 supplies as input, at the least, to the URI or partial URI in operation 310, to the CSP, such that the URI or partial URI is used as a key to obtain relationship data 330. Other details, such as language, geographical details, and other details, may also be provided. The connection to the CSP would typically be conducted via HTTPS, however, the protocol used to communicate can easily be replaced with any other communication protocol capable of transmitting data. The connection to the CSP may also be encrypted.

A CSP query 320 may include varying amounts of data. At the very least, a URI or partial URI is transmitted to the CSP from the web browser. Typically this would be data in XML format, but other formats, human readable or otherwise, would satisfy this operation. An example of what the data may look like may be:

```
<query version="1.0">
    <request>http://domain/path/file?key=value</request>
</query>.
```

An alternative form of the query may include posting data to the CSP according to HTTP, or even obtaining data according to HTTP. An example of a get request may look like a query for example, consider the request "http://CSP/request.php?uri=domain/path/file". Again, these link examples are generic and are intended to illustrate underlying data formats and parameters and are not actual web link locations that are accessible via the Internet. In this example, a specific CSP server is contacted by using a uniquely crafted URI, and such that the domain information is embedded within. One skilled in the art will appreciate the wide variety of communication mechanisms that exist and would suffice as replacements to this example.

A CSP query, in a more complicated form, may look like the following in order to specify the language of the data, and various other parameters to modify data:

```
<query version="1.0">
    <request>http://domain/path/file?key=value</request>
    <language>en-US</language>
    <details>true</details>
    <not>1232,3353,1134,0887</not>
    <exclude>memberships</exclude>
    <include>legal</include>
</query>.
```

A response from the CSP will yield a relationship data 330, and may look like the following, in an XML format:

```
<result>
    <csp>http://alternativeCSP</csp>
<csp>https://AnotherDifferentCSPThatMayContainOtherRelationships
</csp>
```

-continued

```
<relationship identifier='abc123'>
    <entity>Company</entity>
    <detail>detailed information</detail>
</relationship>
<relationship       lang='en-us'       identifier='def456'
uniqueness='*.gov/*'>
    <entity>Company</entity>
    <detail>information</detail>
</relationship>
</result>.
```

In FIG. 7, relationship data 330 can be either specific to a single URI or broad to apply to a set of URIs. For example, the credentials bestowed upon different branches of government may all be the same if the issuer is the same for all credentials bestowed. To continue with the example for the case of the United States, the set of domains "house.gov" and "senate.gov" may have identical credentials as provided by the United States Constitution. This example illustrates that any URI with either of those domains would have a common credential, and such examples of URI with the common credential could be http://www.house.gov/paul/ and http://hutchison.senate.gov/. Relationship data 330 is a document, typically electronic in form, also in either human readable or machine readable form, optionally encrypted, that contains identifiable information that indicates one or more relationships between a holder and one or more issuers. Relationship data 330 may contain none, one, or more relationships.

In FIG. 7, the presence or absence of relationship data 330 determines a change in state of the user interface of a web browser to either indicate the presence, or lack of, the aforementioned relationship data 330. If the URI has any relationships, then this configuration provides a platform for such information to be conveyed. In the case of relationship data 330 indicating relationships, then a modify GUI 340 operation occurs. This operation can change the browser GUI from what is displayed in FIG. 1, to a form of that of FIG. 3A, which has a relationship indicator 30 displayed. If no relationship data 330 is present, then the web browser GUI is placed into a state such that the relationship indicator 30 from FIG. 3A is not present or indicates that no such data or relationship exists.

Relationship data 330 is rendered by the web browser 110, or Internet enabled device, where the input used to render the data may come from an image, such as a logo, either embedded or referred to in the relationship data 330. A rendering of the relationship data 330 does not have to be a visual rendering, but could also include a sound rendering in order to accommodate people with visual impairments. A rendering of relationship data 330 may be considered as a notification, where various forms of notification may be used depending on the physical abilities of the person receiving the notification. In FIG. 4, the avowed logo 40 is an example representation of rendered relationship data 330 from FIG. 7. A rendering, in the form of an avowed logo 40, via relationship data 330, is to be considered as a form of modifying of the GUI, at operation 340.

Example embodiments of the invention provide that the relationship indicator 30 from FIG. 4 is displayed within a web browser's GUI such that it is distinctly separate from URI document content. A distinction is such that a logo 20, illustrated in FIG. 4, or a statement of relationship 10, also in FIG. 4, is controlled by a holder, where the avowed logo 40 in a relationship indicator 30 is controlled by an issuer. Relationship data 330, from FIG. 7, which is a digital form of relationships as described above, is manifested as an indicator, generally rendered in the form of a logo. Relationship data 330 may be used to indicate an established relationship between a holder and an issuer by way of a URI, or partial URI as input to a credential service provider.

Figure 8:
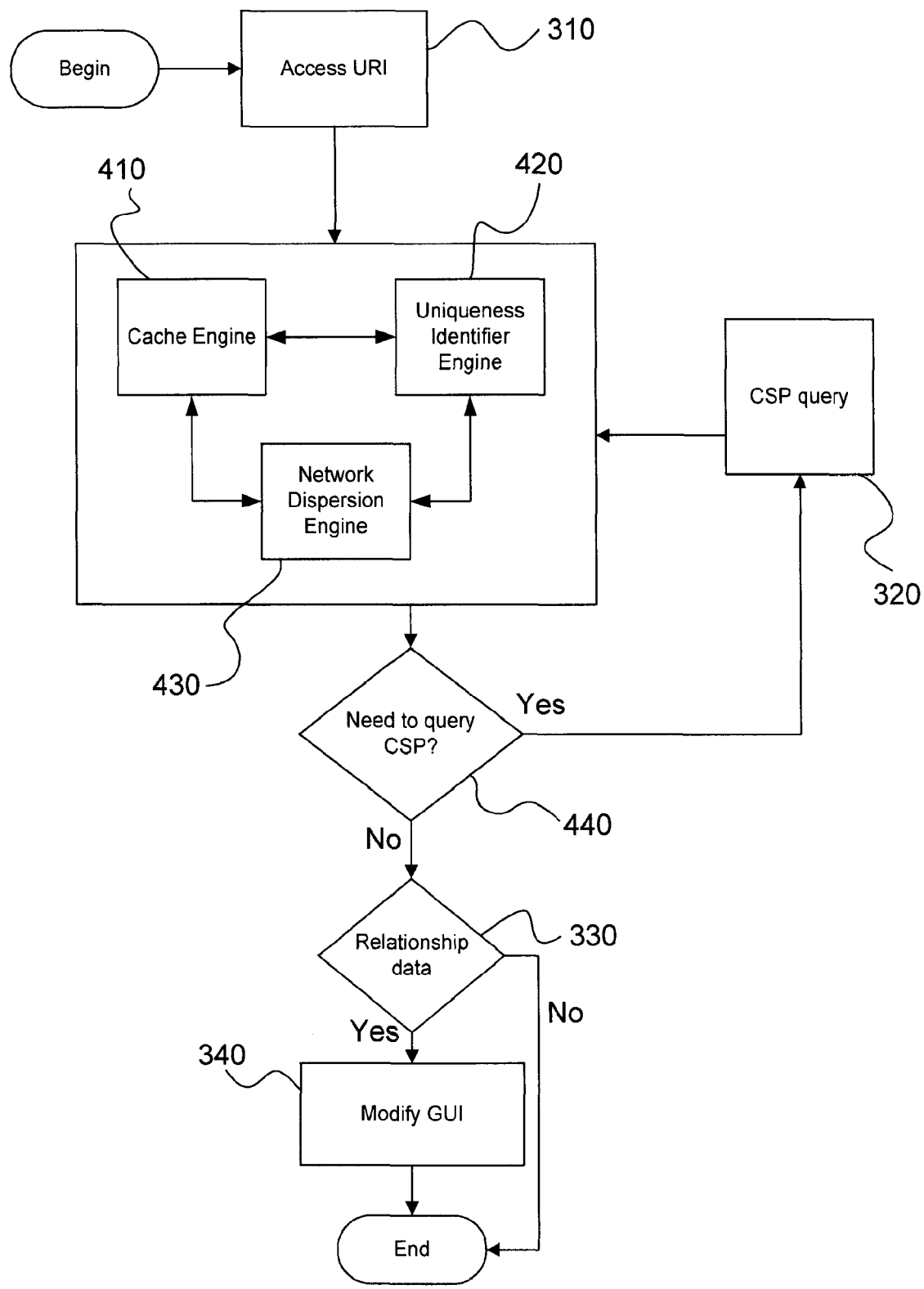
FIG. 8 is another flowchart method, according to example embodiments of the present invention.
Figure 9:
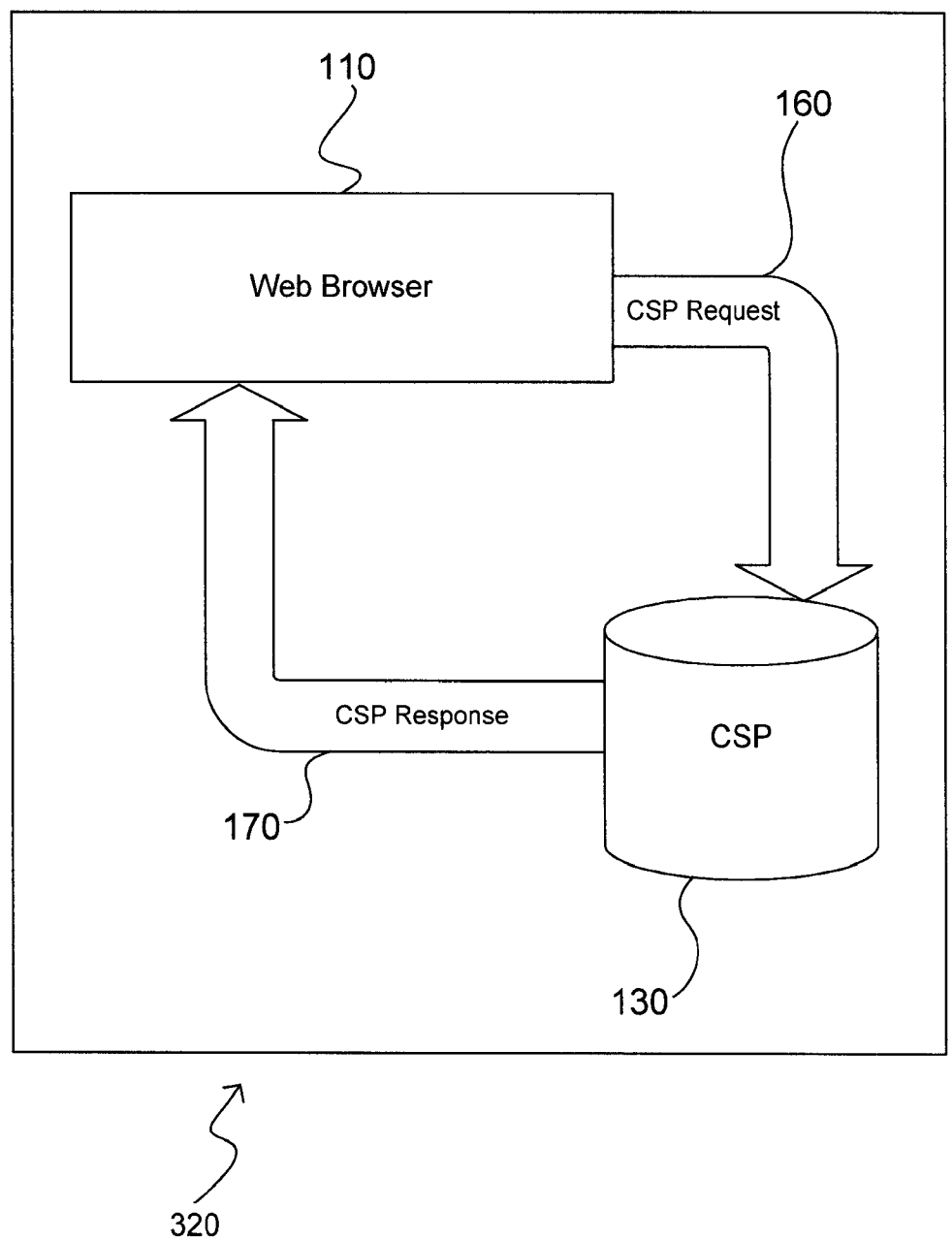
FIG. 9 is a detail view of a Credential Service Provider (CSP) query, according to example embodiments of the present invention.

In FIG. 8, alternative embodiments are illustrated. The elements of a cache engine 410, a uniqueness identifier engine 420, and a network dispersion engine 430 are such that they are entirely optional with regard to the present invention, and do not require the presence of the other items in order to function properly. Functionality of one can affect the others as described below.

In FIG. 8, a cache engine 410, is a mechanism of storing relationship data 330 locally within a web browser 110 from FIG. 5. The cache engine 410 is entirely optional as not all web browsers are capable of storing data locally. In an optimal implementation of the invention, a cache engine 410 stores data in a local file such that records of data can be easily retrieved. An example of such a storage mechanism would be a SQL capable database stored on a local disk drive.

There are various ways of storing data on a device, in many different physical and logical schemes, such that functionality is equivalent so that data can be stored and retrieved. When a URI is accessed 310, the cache engine 410 can be queried for relationship data 330. If relationship data is not found in the local cache, then the operation of needing to query the CSP 440 is "yes", and in turn the CSP is queried, at operation 320.

Example embodiments of the present invention do not require that a need to query CSP 440 operation follow the branch along the no path if relationship data is retrieved via the cache engine 410. Stated another way, if relationship data is obtained from the cache engine 410, then the CSP can still be queried.

In FIG. 8, the determining factor to establish the state for a need to query CSP 440 operation is based on application specific criteria. For example, one manufacturer of a web browser may implement this configuration such that even in the presence of cached relationship data, the CSP is always queried to maintain freshness of information. Another manufacturer of a competing web browser may implement the determining criteria for the need to query CSP 440 operation such that if a website is visited again within a twenty-four hour period, the CSP is not queried as long as relationship data is stored in the cache.

A third competing browser manufacturer may implement the determining criteria such that its state is controlled by user specified settings, as someone utilizing a low bandwidth connection may want to be more conservative with CSP queries. The determination of the state of query in this regard is highly dependent on the scenario of implementation, which is impossible to describe in detail all variations of situations that may affect a need to query CSP 440. However, one skilled in the art will appreciate the flexibility in utilizing a flexible determination criteria on implementation, as the example embodiments of the present invention are implemented with a vast array of Internet enabled devices and applications. Such implementation specific designations regarding the determining criteria for the need to query CSP 440 operation are analogous to a physical material in the production of a machine such that the machine can still function as defined with a variety of alternative materials.

In FIG. 8, a uniqueness identifier engine 420 may be implemented to determine the need to query the CSP 440. A uniqueness identifier may be used to establish the uniqueness of a URI within the context of relationships. For example, "http://www.house.gov/paul/", when used as input during a CSP query may yield a set of relationships specific to every URI residing on the domain "house.gov." There may also be one or more sets of relationships with a uniqueness identifier indicating that specific relationships are specific to URI that are of the form "www.house.gov/paul."

This uniqueness identifier allows a relationship to indicate a broad collection of URIs within to associate with one or more relationships. A uniqueness identifier may be implemented as a wild card matching system, such that URI that match the uniqueness identifier as returned by the CSP are considered equivalent. For example, "http://www.house.gov/" and "http://house.gov/" might both match a uniqueness identifier represented as "http://*.house.gov/*" where the asterisk is considered a wild card character that matches any string of information. Other variations of the expression may utilize regular expressions, or other such matching capability.

A uniqueness identifier may also be present within the content body of a web page, or as part of the URI, as a hint to the web browser to perform a CSP query. In this situation, the uniqueness identifier is a token or marker to inform the browser that there may exist relationship data specific to that URI such that the browser may perform a CSP query to obtain the URI specific relationship data. For example, a video sharing website may have a particular relationship that gets displayed via the relationship indicator 30. However, a member of that site may have a sub-page that would need to display credentials specific to their own relationships, such as membership in the screen actors' guild, as an example.

A CSP query may then provide specific relationship data for a currently accessed URI. Depending on the response from the CSP, the sub-page may have either a set of unique credentials, or credentials in addition to those of the root video web site. If there are unique credentials associated with sets of URI, then a response from a CSP may indicate, possibly with a matching scheme, such sets. That is to say that a single CSP query may indicate specific relationships for a group of URI associated with one another in the sense that they all share one or more unique credentials that are not associated with every URI.

To continue with the above example, the end result is that personal and unique credentials are displayed when people view that person's videos on the site. A uniqueness identifier might take the form of a meta-tag, and may look like <meta name='unique' content='true'/>. The browser may apply this as part of a determining criteria if need to query CSP 440 should be "yes" or "no." If relationship data was already queried for a URI with a uniqueness identifier, and that relationship data matches a subsequent URI, then the need to query the CSP 440 may not be necessary.

In continuing the preceding example, an example of such a scenario would be if multiple videos are accessed via corresponding URIs, and each URI contains a uniqueness identifier, then only one query to the server needs to be performed. The server may respond with its own uniqueness identifier that supersedes identifiers obtained through the URI.

A uniqueness identifier is a way to control CSP queries by establishing when queries are necessary, and from that, when they are not necessary. The mechanism for understanding and altering state, the uniqueness identifier engine 420, may work in conjunction with the cache engine 410, such that uniqueness identifiers are cached and used as a mechanism to match URI to relationship data.

In FIG. 8, a network dispersion engine 430, is a mechanism to relieve network congestion. A CSP may have data spread across many servers and in various parts of the world. There may be other types of criteria for data separation, such as redundancy, legality, multiple entities acting as credential service providers, and language support, etc. For example, there may be servers that contain relationship information in the language of Spanish, and so forth for other such languages, essentially dividing up data among many machines.

Servers may be geographically located as well. As an example, CSP servers with relationships for Japanese companies might be located in Tokyo, Japan. In such a distribution of data, a query to the CSP may take into account various metrics, such as the location of an entity 110, from FIG. 5, requesting relationship data, the language the CSP query is requesting the data to be in, the Internet service provider, etc.

An implementation of a network dispersion engine 430 is such that decisions to query a CSP are determined based on specific metrics, as mentioned above. A network dispersion engine 430 residing on a computer with the system language of en-US may default its CSP query 320 to the CSP server designated as "https://en-US.CSP/" while a network dispersion engine 430 on a computer with a system language of en-GB would default its query to "https://en-GB.CSP/." A CSP response 170, in FIG. 5, may contain data that serves as input for the network dispersion engine 430. Such input may include providing alternative credential service providers. An example CSP response 170 that contains data as utilized by a network dispersion engine 430 may look like the following:

```
<response>
    <relationships for="sony.jp">
        <count>0</count>
    </relationships>
    <dispersion>
        <relationships for="*://sony.jp/*">
            <at count="3" lang="ja" csp="http://tokoyo.csp/" />
            <at          count="5"          lang="en" csp="http://washington.csp/">
                <list>3342,5517,3847,1356</list>
            </at>
            <unique total="43">
                <path data="/corporate/*" />
                <path data="/products/*" />
            </unique>
        </relationships>
    </dispersion>
</response>.
```

In the previous CSP response 170 listing, data enclosed in the dispersion tags serve to determine network access by relaying the location of relationship information for the domain "sony.jp" as divided by language. A web browser may use this data as a mechanism for determining state for the need to query CSP 440, in FIG. 8. The determination mechanism, as someone skilled in the art would recognize, is dependent on web browser implementation. For example, a web browser on a cell phone may opt to ignore instructions or suggestions to contact other CSP servers due to hard coded limits or user defined specific limits on network access in order to prevent incurring extra costs due to the data transfer.

In FIG. 8, a network dispersion engine 430 can work in tandem with a cache engine 410 to determine the state regarding a need to query CSP 440. The cache engine 410 can store relationship data in multiple languages, originating CSP, and various other metrics used by a network dispersion engine 430. For example, if the network dispersion engine 430 sets the state to answer "yes" to the need to query CSP 440 because relationship data states that additional relationship information is stored on other servers, the cache engine 410 can set state to answer "no" to the need to query CSP 440 if it has that data locally, or alternatively the cache engine 410 can modify the CSP to contact if some relationships are cached but others needed to be queried.

In FIG. 8, a network dispersion engine 430 can work in tandem with a uniqueness identifier engine 420 to determine state regarding a need to query CSP 440. A uniqueness identifier may suggest that a URI is unique in such a way that it would set state to answer yes to a need to query CSP 440. The network dispersion engine 430 can override a state set by the uniqueness identifier engine 420 with regard to determining a need to query CSP 440.

Although specific examples were used above in describing the invention, such language should not be construed as limiting the implementation of the invention. Various components can be used in various combinations and in various order, with some components absent and some operations absent, yet still comprise the invention as laid forth in the claims. The invention can be implemented in machine readable instructions stored on physical media used to alter the state of a machine. Examples of physical media containing machine readable instructions may be CD-ROM, hard disk drives, RAM, ROM, punch cards, flash memory, or other such medium suitable for such machine readable instructions. A machine capable of reading instructions that can alter its state include a general purpose processor, a special purpose processor, or other such computable device capable of reading instructions and altering state.

Thus a reader can see that a relationship indicator provides a convenient mechanism of ascertaining credentials. The invention extends the concept of meaningful connections beyond a business to business (B2B) or business to consumer (B2C) connection into a plurality of three party systems, such as business to business to business (B2B2B) or business to business to consumer (B2B2C) scenarios. With this invention, consumers utilizing a web browser can now determine credibility of businesses by those businesses' relationships with other businesses. Difficulties regarding the researching of credentials of businesses on the Internet are reduced by alleviating the requirement of having to find appropriate authorities. Claims made by entities on the Internet can be known to be authentic such that the entity represented as issuing the credential is directly responsible for the presence of the indicator stating such credential. Consumers and businesses can immediately know something about another business because they know that stated credentials of that business are authentic, and by familiarity with various credentials can identify legitimate entities.

While the above invention contains specific examples or implementations, these should not be construed as limitations on the scope of the invention, but rather as an exemplification of one preferred embodiment thereof. Many other variations are possible. For example, a web browser could be designed as a computer program without a traditional user interface that obtains credential information to be displayed in various locations and ways, like an employment website utilizing an OpenID solution where the OpenID provider is a University such that the OpenID URI is used to allow the employment website to determine if the person represented by the OpenID URI has a degree as issued by the University, and such that the employment website manifests the relationship identifier in such a way unique to their system for various other means or reporting mechanisms. Stated another way, an employer may see logos next to potential employees on a website where the logo represents a relationship between the potential employee and various credential issuers, such as Universities that issue degrees.

What is claimed is:

1. A method to display relationship data, comprising:
   obtaining the relationship data from a credential service provider, wherein the relationship data is a credential bestowed by an issuer entity onto a holder entity, wherein the credential is a statement made by the issuer entity about the holder entity, wherein the credential service provider is a repository of the relationship data, wherein the issuer entity provides the relationship data to the credential service provider, wherein the issuer entity, the holder entity, and the credential service provider are separate entities;
   using a portion of a uniform resource identifier as a key to access the relationship data on the credential service provider, wherein the relationship comprises an existence of an issued credential between an issuer entity and the holder entity associated with the uniform resource identifier, wherein the issuer entity has provided the credential to the credential service provider for storage;
   retrieving the issued credential by bypassing the holder entity and forwarding the issued credential from the credential service provider to a web browser; and
   rendering a representation of the relationship data, wherein the rendering of the relationship data is performed in a graphical user interface of the web browser, and wherein the web browser displays a rendering of the representation of the relationship data such that there is a visual representation of the relationship between the issuer entity and the holder entity associated with the uniform resource identifier.

2. The method of claim 1, further comprising:
   storing the relationship data via a cache engine.

3. The method of claim 2, further comprising:
   analyzing tokens to control query frequency to the credential service provider.

4. The method of claim 2, further comprising:
   controlling access and determining access to the credential service provider via a network dispersion engine.

5. The method of claim 1, further comprising:
   analyzing tokens to control query frequency to the credential service provider via a uniqueness identifier engine.

6. The method of claim 1, further comprising:
   controlling access and determining access to the credential service provider via a network dispersion engine.

7. The method of claim 1, further comprising:
   determining whether a query is necessary based on a user initiated access operation, and, if so, performing the query, and, if not, determining whether there is relationship data and modifying the user interface based on the relationship data.

8. An apparatus configured to display relationship data, comprising:
   a processor configured to
     obtain the relationship data from a credential service provider, wherein the relationship data is a credential bestowed by an issuer entity onto a holder entity, wherein the credential is a statement made by the issuer entity about the holder entity, wherein the credential service provider is a repository of the relationship data, wherein the issuer entity provides the relationship data to the credential service provider, wherein the issuer entity, the holder entity, and the credential service provider are separate entities,
use a portion of a uniform resource identifier as a key to access the relationship data on the credential service provider, wherein the relationship comprises an existence an issued credential established between an issuer entity and the holder entity associated with the uniform resource identifier, wherein the issuer entity has provided the credential to the credential service provider for storage,
retrieve the issued credential by bypassing the holder entity and forward the issued credential from the credential service provider to a web browser;
render a representation of the relationship data, wherein the rendering of the relationship data is performed in a graphical user interface of the web browser; and
a display with a web browser configured to display a rendering of the representation of the relationship data such that there is a visual representation of the relationship between the issuer entity and the holder party entity associated with the uniform resource identifier.

9. The apparatus of claim 8, further comprising:
a cached engine configured to store the relationship data.

10. The apparatus of claim 9, wherein the processor is further configured to analyze tokens to control query frequency to the credential service provider.

11. The apparatus of claim 9, further comprising:
a network dispersion engine configured to control access and to determine access to the credential service provider.

12. The apparatus of claim 8, further comprising:
a uniqueness identifier engine configured to analyze tokens to control query frequency to the credential service provider.

13. The apparatus of claim 8, further comprising:
a network dispersion engine configured to control access and determine access to the credential service provider.

14. The apparatus of claim 8, wherein the processor is further configured to perform determining whether a query is necessary based on a user initiated access operation, and, if so, performing the query, and, if not, determining whether there is relationship data and modifying the user interface based on the relationship data.

15. A non-transitory computer readable storage medium configured to store instructions, that when executed causes a processor to perform:
obtaining relationship data from a credential service provider, wherein the relationship data is a credential bestowed by an issuer entity onto a holder entity, wherein the credential is a statement made by the issuer entity about the holder entity, wherein the credential service provider is a repository of the relationship data, wherein the issuer entity provides the relationship data to the credential service provider, wherein the issuer entity, the holder entity, and the credential service provider are separate entities;
using a portion of a uniform resource identifier as a key to access the relationship data on the credential service provider, wherein the relationship comprises an existence of an issued credential between an issuer entity and the holder entity associated with the uniform resource identifier, wherein the issuer entity has provided the credential to the credential service provider for storage;
retrieving the issued credential by bypassing the holder entity and forwarding the issued credential from the credential service provider to a web browser; and
rendering a representation of the relationship data, wherein the rendering of the relationship data is performed in a graphical user interface of the web browser, and wherein the web browser displays a rendering of the representation of the relationship data such that there is a visual representation of the relationship between the issuer entity and the holder entity associated with the uniform resource identifier.

16. The non-transitory computer readable storage medium of claim 15, wherein the processor is further configured to perform:
storing the relationship via a cache engine.

17. The non-transitory computer readable storage medium of claim 16, wherein the processor is further configured to perform:
analyzing tokens to control query frequency to the credential service provider.

18. The non-transitory computer readable storage medium of claim 15, wherein the processor is further configured to perform:
analyzing tokens to control query frequency to the credential service provider via a uniqueness identifier engine.

19. The non-transitory computer readable storage medium of claim 15, wherein the processor is further configured to perform:
controlling access and determining access to the credential service provider via a network dispersion engine.

20. The non-transitory computer readable storage medium of claim 15, wherein the processor is further configured to perform:
determining whether a query is necessary based on a user initiated access operation, and, if so, performing the query, and, if not, determining whether there is relationship data and modifying the user interface based on the relationship data.

* * * * *